US008615266B2

(12) United States Patent
Bonneville et al.

(10) Patent No.: US 8,615,266 B2
(45) Date of Patent: Dec. 24, 2013

(54) METHOD AND A DEVICE FOR ADJUSTING THE TRANSMISSION POWER OF SIGNALS

(75) Inventors: Hervé Bonneville, Rennes Cedex 7 (FR); Loïc Brunel, Rennes Cedex 7 (FR); Damien Castelain, Rennes Cedex 7 (FR); Nicolas Gresset, Rennes Cedex 7 (FR); Mourad Khanfouci, Rennes Cedex 7 (FR); David Mottier, Rennes Cedex 7 (FR)

(73) Assignee: Mitsubishi Electric Corporation, Tokyo (JP)

( * ) Notice: Subject to any disclaimer, the term of this patent is extended or adjusted under 35 U.S.C. 154(b) by 870 days.

(21) Appl. No.: 12/692,960

(22) Filed: Jan. 25, 2010

(65) Prior Publication Data
US 2010/0197338 A1   Aug. 5, 2010

(30) Foreign Application Priority Data
Feb. 5, 2009  (EP) .................................. 09152196

(51) Int. Cl.
*H04B 7/00* (2006.01)
(52) U.S. Cl.
USPC ....... 455/522; 455/63.1; 455/127.1; 455/296; 370/317; 370/318
(58) Field of Classification Search
USPC ........... 455/422.1, 449, 448, 450, 452.2, 522, 455/501, 434, 456.5, 296, 278.1, 63.1, 455/114.2; 370/338, 331, 339, 342, 441, 370/318, 317
See application file for complete search history.

(56) References Cited

U.S. PATENT DOCUMENTS

| 5,831,974 | A  | * | 11/1998 | Suonvieri ...................... 370/252 |
| 8,223,705 | B2 | * | 7/2012  | Tao et al. ...................... 370/329 |
| 2007/0042799 | A1 |   | 2/2007  | Jubin et al. |
| 2008/0146154 | A1 |   | 6/2008  | Claussen et al. |
| 2009/0221295 | A1 | * | 9/2009  | Sahin et al. .................... 455/450 |
| 2010/0035556 | A1 | * | 2/2010  | Cai et al. ...................... 455/63.2 |
| 2010/0075694 | A1 | * | 3/2010  | Damnjanovic et al. .... 455/452.2 |

(Continued)

FOREIGN PATENT DOCUMENTS

WO   WO 2008/093100 A2   8/2008
WO   WO 2009/000791 A2   12/2008

OTHER PUBLICATIONS

U.S. Appl. No. 12/694,679, filed Jan. 27, 2010, Bonneville, et al.

*Primary Examiner* — Sujatha Sharma
(74) *Attorney, Agent, or Firm* — Oblon, Spivak, McClelland, Maier & Neustadt, L.L.P.

(57) ABSTRACT

The present invention concerns a method for adjusting the transmission power of signals transferred by or to a first base station, the first base station being located in the cell of a second base station, the first base station:
transfers a first message to the second base station,
receives a message comprising information representative of the path between the first base station and the second base station,
receives messages transferred by the second base station to mobile terminals, information comprised in at least one message enabling the determination of the coverage of the second base station,
computing a metric from both information,
adjusting, according to the computed metric, the transmission power of the signals transferred by the first base station to at least a mobile terminal and/or the transmission power of the signals transferred to the first base station by at least one mobile terminal.

16 Claims, 4 Drawing Sheets

(56) References Cited

U.S. PATENT DOCUMENTS

| | | | |
|---|---|---|---|
| 2010/0144338 A1* | 6/2010 | Kim et al. | 455/422.1 |
| 2010/0189085 A1* | 7/2010 | Kent et al. | 370/338 |
| 2011/0086651 A1* | 4/2011 | Li et al. | 455/501 |
| 2011/0098055 A1* | 4/2011 | Kwon et al. | 455/452.2 |
| 2011/0105132 A1* | 5/2011 | Vasudevan et al. | 455/448 |
| 2011/0319066 A1* | 12/2011 | Chou et al. | 455/422.1 |
| 2012/0108255 A1* | 5/2012 | Jo et al. | 455/450 |
| 2012/0165032 A1* | 6/2012 | Park et al. | 455/452.1 |

* cited by examiner

METHOD AND A DEVICE FOR ADJUSTING THE TRANSMISSION POWER OF SIGNALS

The present invention relates generally to a method and a device for adjusting the transmission power of the signals transferred by a base station through a wireless interface and/or transferred to the base station by at least one mobile terminal served by the base station.

Wireless cellular telecommunication networks are largely deployed but there are still some areas not covered by the base stations of the wireless cellular telecommunication network.

For example, the access to the wireless cellular telecommunication network might not be possible for a mobile terminal located in a building, if the signals radiated by the base stations and/or by the mobile terminal are too attenuated.

Solutions are proposed today. Particular base stations, like home base stations or femto base stations, provide coverage areas within the buildings.

The home base stations or femto base stations provide a limited coverage area. Due to the constant coverage area size reduction and spectral efficiency increase, inter-cell interference has become a main issue. Inter-cell interference coordination (ICIC) techniques intend to mitigate the inter-cell interference problem. Classically, a mobile terminal reports to the base station the mobile terminal is currently served by, the interference it receives from neighbouring base stations and/or home base stations. Base stations exchange also messages between each other in order to allow an efficient ICIC. However, the base station to base station messages need establishment of links between the base stations. The same links between base stations and home base stations or between home base stations cannot be established in some cases.

A massive deployment of home base stations prevents from having such links between a base station and all the home base stations located within the coverage area of the base station. Even if the links exist, the amount of messages on these links must be as low as possible in order not to put an excessive burden on the core network. These home base stations may strongly interfere with the base station and even create coverage holes.

Without shadowing, the interference level depends on the distance separating the base station and the home base station. In the downlink channel, the higher the distance between base station and home base station is, the larger the area in which the mobile terminals served by the base station and located in the vicinity of the home base station are strongly interfered is. For the uplink channel, the lower the distance between the base station and home base station is, the higher the interference created by the mobile terminals served by the home base station is for the mobile terminals served by the base station.

With shadowing, the interference level is not only related to the distance between the home base station and the base station. In downlink channel, the interference also depends on the shadowing between each mobile terminal close to the home base station and the base station. In uplink channel, the interference also depends on the shadowing between each mobile terminal served by the home base station and the base station.

These home base stations may enable a limited number of mobile terminals to access the wireless cellular telecommunication network through their respective resources. The mobile terminals allowed to access the resources of the network through the home base station may be determined by the owner of the home base station, the network or a combination of both.

The owner must be understood here in the general sense: the owner may only be the main user of the home base station, the owner may be the person who rents the home base station or the owner may be the person who accommodates the home base station in his house or office.

For example, only mobile terminals of the owner of the home base station and its family can access the wireless cellular telecommunication network through the home base station. These mobile terminals are associated with the home base station.

Base stations enable a large number of mobile terminals to access the wireless cellular telecommunication network through their respective resources. The mobile terminals allowed to access the resources of the network through the base station may be determined by the operator of the wireless cellular telecommunication network.

The cell of a base station is usually much larger than a cell of a home base station.

From above mentioned differences, an operator would probably like to prioritize traffic through base stations instead of the one through home base stations. Thus, priority should be put on minimizing the interference created by home base stations on signals from base stations and minimizing the interference created by mobile terminals served by home base stations on signals from mobile terminals served by base stations.

The present invention aims at avoiding that signals transferred between home base stations and mobile terminals served by the home base stations interfere on signals transferred between base stations and mobile terminals served by the base stations.

To that end, the present invention concerns a method for adjusting the transmission power of the signals transferred by a first base station through a wireless interface and/or transferred to the first base station, the first base station being located in the cell of a second base station, characterised in that the method comprises the steps executed by the first base station of:

transferring through the wireless interface of the first base station a first message to the second base station, receiving through the wireless interface of the first base station, a message comprising information representative of the path between the first base station and the second base station, receiving through the wireless interface messages transferred by the second base station to mobile terminals, information comprised in at least one message enabling the determination of the coverage of the second base station, computing a metric from both information, adjusting, according to the computed metric, the transmission power of the signals transferred by the first base station to at least a mobile terminal served by the first base station through the wireless interface and/or the transmission power of the signals transferred to the first base station by at least one mobile terminal served by the first base station.

The present invention concerns also a device for adjusting the transmission power of the signals transferred by a first base station through a wireless interface and/or transferred to the first base station, the first base station being located in the cell of a second base station, characterised in that the device for adjusting the transmission power is included in the first base station and comprises:

means for transferring through the wireless interface of the first base station a first message to the second base station, means for receiving through the wireless interface of the first base station, a message comprising information representative of the path between the first base station and the second base station, means for receiving through the wireless interface messages transferred by the second base station to mobile terminals, information comprised in at least one message enabling the determination of the coverage of the second base station, means for computing a metric from both information, means for adjusting, according to the computed metric, the transmission power of the signals transferred by the first base station to at least a mobile terminal served by the first base station through the wireless interface and/or the transmission power of the signals transferred to the first base station by at least one mobile terminal served by the first base station.

Thus, the interferences generated by the first base station on signals transferred between the second base station and mobile terminals served by the second base station are reduced.

Furthermore, the interferences generated by the mobile terminals served by the first base station on signals transferred between the second base station and mobile terminals served by the second base station are reduced.

According to a particular feature, information representative of the path between the first and the second base stations is a timing advance information which is representative of the distance separating the base stations.

Thus, the first base station is able to evaluate a distance very accurately from the timing advance information. Indeed, the timing advance information is usually equal or very close to the round trip delay between the first and the second base stations and is thus directly linked to the path distance between the first and second base stations via the light celerity.

According to a particular feature, information representative of the path between the first and the second base stations is a power control information, which indicates with which power the first base station should transfer signals to the second base station and/or the transmission power of signals transferred by the second base station to the first base station.

Thus, the first base station can extract an information on the path gain between the first base station and the second base station from this information. Indeed, the higher the indicated power is, the lower the path gain is. Every propagation characteristic is included in this path gain, including also transmit and receive antenna patterns and shadowing.

According to a particular feature, information representative of the path between the first and the second base stations is a modulation and coding scheme which should be used by the first base station to transfer signals to the second base station and/or which has been used by the second base station to transfer signals to the first base station.

Thus, the first base station can extract an information on the path gain between the first base station and the second base station from this information. Indeed, the lower the spectral efficiency of the indicated modulation and coding scheme is, the lower the path gain is. Every propagation characteristic is included in this path gain, including also transmit and receive antenna patterns and shadowing.

According to a particular feature, information representative of the path between the first and the second base stations is the number of resources of a downlink channel, the resources being intended for the first base station by the second base station, the downlink channel being the channel used by the second base station for transferring data to the first base station and/or to at least one mobile terminal.

Thus, the first base station can extract an information on the path gain between the first base station and the second base station from this information.

Indeed, if the same information bits are coded on all resources of the downlink channel intended for the first base station by the second base station, whatever the number of resources, increasing the number of resources results in decreasing the spectral efficiency. Thus, the higher the number of resources is, the lower the path gain is. Every propagation characteristic is included in this path gain, including also transmit and receive antenna patterns and shadowing.

According to a particular feature, information representative of the path between the first and the second base stations is comprised in at least one resource of a downlink channel, the at least one resource being intended for the first base station by the second base station, the downlink channel being a channel used by the second base station for transferring data to the first base station and/or to at least one mobile terminal and information representative of the path between the first and the second base stations is the reception power of signals transferred in the at least one resource with respect to average power of signals transferred in other resources of the downlink channel.

Thus, the first base station can extract an information on the path gain between the first base station and the second base station from this information. Indeed, the higher the reception power of signals transferred in the at least one resource with respect to average power of signals transferred in other resources is, the lower the path gain is. Every propagation characteristic is included in this path gain, including also transmit and receive antenna patterns and shadowing.

According to a particular feature, information representative of the path between the first and the second base stations is comprised in at least one resource of the downlink channel intended for the first base station by the second base station and is a modulation and coding scheme.

Thus, the first base station can extract an information on the path gain between the first base station and the second base station from this information. Indeed, the lower the spectral efficiency of the modulation and coding scheme is, the lower the path gain is. Every propagation characteristic is included in this path gain, including also transmit and receive antenna patterns and shadowing.

According to a particular feature, the message comprising information enabling the determination of the coverage of the second base station is a message transferred by the second base station to one mobile terminal served by the second base station.

Thus, no special signalling of the coverage is needed and overhead is limited. The first base station only uses at least one message transferred by the second base station to one mobile terminal served by the second base station for other purposes than the original purpose of the message. If the purpose is a response to a random access message transferred by one mobile terminal, identifying such a message may be easier for the first base station due to the low number of these responses.

If the purpose is control signalling, the number of messages is higher and the determination of the coverage of the second base station is more accurate.

According to a particular feature, information comprised in at least one message enabling the determination of the coverage of the second base station is a timing advance information which is representative of the distance separating the second base station and one mobile terminal served by the second base station.

Thus, overhead is limited. The first base station can extract an accurate coverage information.

Indeed, the timing advance information is anyway needed in many systems in order to guarantee uplink synchronism between different mobile terminals served by the second base station.

Furthermore, the timing advance information of one mobile terminal is usually very close to the round trip delay between the second base station and the mobile terminal and is thus directly linked to the distance between the second base station and the mobile terminal via the light celerity.

If the mobile terminal is close to the cell boundary of the second base station, this distance represents the coverage of the second base station.

According to a particular feature, information comprised in at least one message enabling the determination of the coverage of the second base station is a power control information, which indicates with which power a mobile terminal served by the second base station should transfer signals to the second base station and/or with which power the second base station has transferred signals to a mobile terminal served by the second base station.

Thus, overhead is limited. The first base station can extract a coverage information including the effect of shadowing (here, we extend the notion of coverage beyond the distance from the base station to the cell boundary; coverage means here lowest path gain in the cell). Indeed, the first base station can extract an information on the path gain between the second base station and a mobile from this information. The higher the indicated power is, the lower the path gain between the second base station and the mobile terminal is. Every propagation characteristic is included in this path gain, including also transmit and receive antenna patterns and shadowing. If the mobile terminal is close to the cell boundary of the second base station, this path gain represents the coverage of the second base station.

According to a particular feature, information comprised in at least one message enabling the determination of the coverage of the second base station is a modulation and coding scheme which should be used by a mobile terminal served by the second base station to transfer signals to the second base station and/or which has been used by the second base station to transfer signals to a mobile terminal served by the second base station.

Thus, overhead is limited and the first base station can extract a coverage information, including the effect of shadowing.

Indeed, the first base station can extract an information on the path gain between the second base station and a mobile from this information. The lower the spectral efficiency of the indicated modulation and coding scheme is, the lower the path gain between the second base station and the mobile is. Every propagation characteristic is included in this path gain, including also transmit and receive antenna patterns and shadowing. If the mobile terminal is close to the cell boundary of the second base station, this path gain represents the coverage of the second base station.

According to a particular feature, information comprised in at least one message enabling the determination of the coverage of the second base station is a control information corresponding to system information broadcasted by the second base station to mobile terminals served by the second base station.

Thus, as all mobile terminals served by the second base station have to correctly decode the system information, the control information contained corresponding to system information is suitable for all mobile terminals including those which are at the cell boundary.

Thus, this information is representative of the cell coverage. Instead of reading control information for many mobile terminals in order to get the coverage information, we can get information which is representative of the cell coverage directly from the control information related to system information. The tasks of the first base stations are then simplified.

According to a particular feature, information comprised in at least one message enabling the determination of the coverage of the second base station is the modulation and coding scheme which has been used by the second base station to broadcast system information to mobile terminals, the modulation and coding scheme being indicated in the control information.

Thus, the modulation and coding scheme can be used as information representative of the cell coverage.

Overhead is limited and the first base station can extract a coverage information, including the effect of shadowing.

The lower the spectral efficiency of the indicated modulation and coding scheme is, the lower the path gain between the second base station and the mobile is. Every propagation characteristic is included in this path gain, including also transmit and receive antenna patterns and shadowing. If the mobile terminal is close to the cell boundary of the second base station, this path gain represents the coverage of the second base station.

As all mobile terminals served by the second base station have to correctly decode the system information, the modulation and coding scheme is suitable for all mobile terminals including those which are at the cell boundary or which experience a poor path gain.

According to a particular feature, information comprised in at least one message enabling the determination of the coverage of the second base station is the number of resources of a downlink channel on which the control information is broadcasted, the downlink channel being a channel used by the second base station for transferring data to the first base station and/or to at least one mobile terminal.

Thus, the first base station can extract an information on the coverage of the second base station from this information.

Indeed, if the same control information bits are coded on plural resources of the downlink channel intended for all mobile terminals by the second base station, whatever the number of resources, increasing the number of resources results in decreasing the spectral efficiency. Thus, the higher the number of resources is, the lower the path gain is. Every propagation characteristic is included in this path gain, including also transmit and receive antenna patterns and shadowing.

As all mobile terminals served by the second base station have to correctly decode the system information, the number of resources of the downlink channel on which the control information is broadcasted is suitable for all mobile terminals including those which are at the cell boundary.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatus according to the invention, they will not be repeated here.

The characteristics of the invention will emerge more clearly from a reading of the following description of an example embodiment, the said description being produced with reference to the accompanying drawings, among which:

Figure 3:
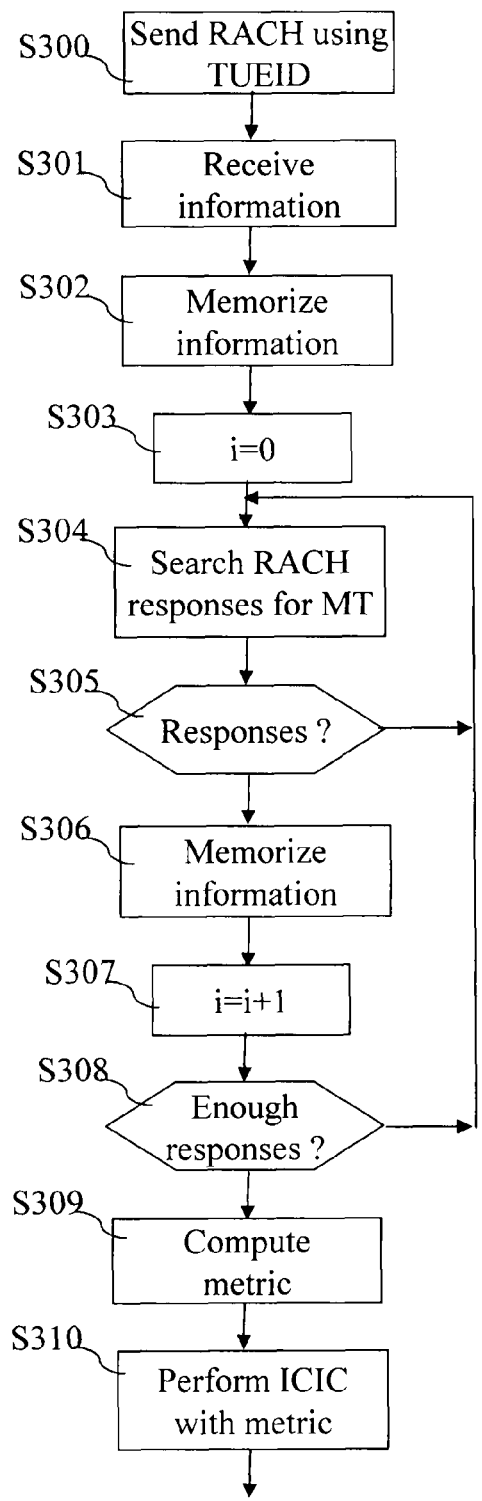
Figure 4:
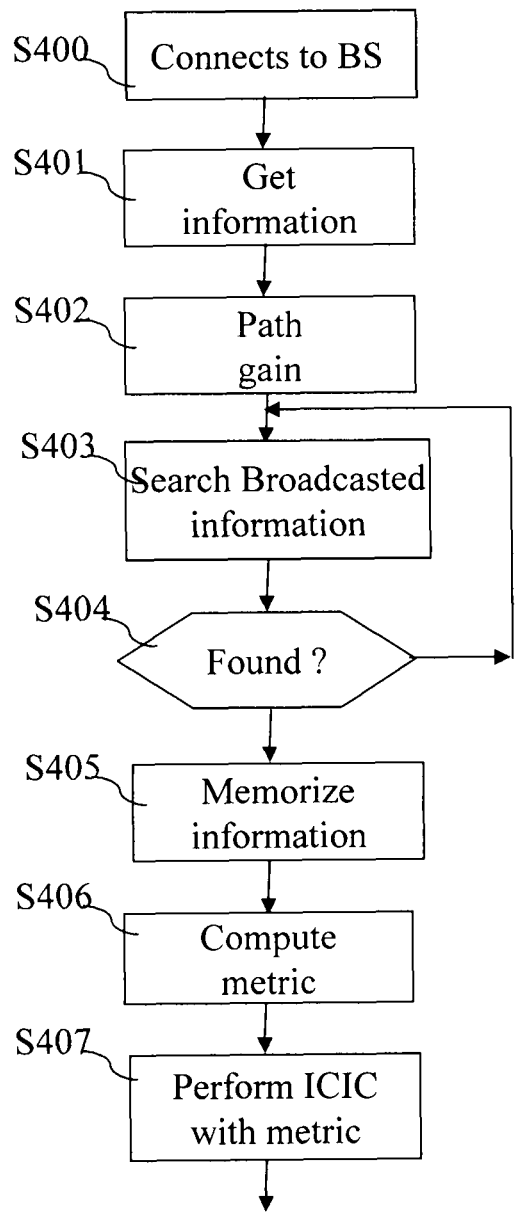

FIG. 3 discloses a first example of an algorithm executed by a home base station according to the present invention;

FIG. 4 discloses a second example of an algorithm executed by a home base station according to the present invention.

Figure 1:
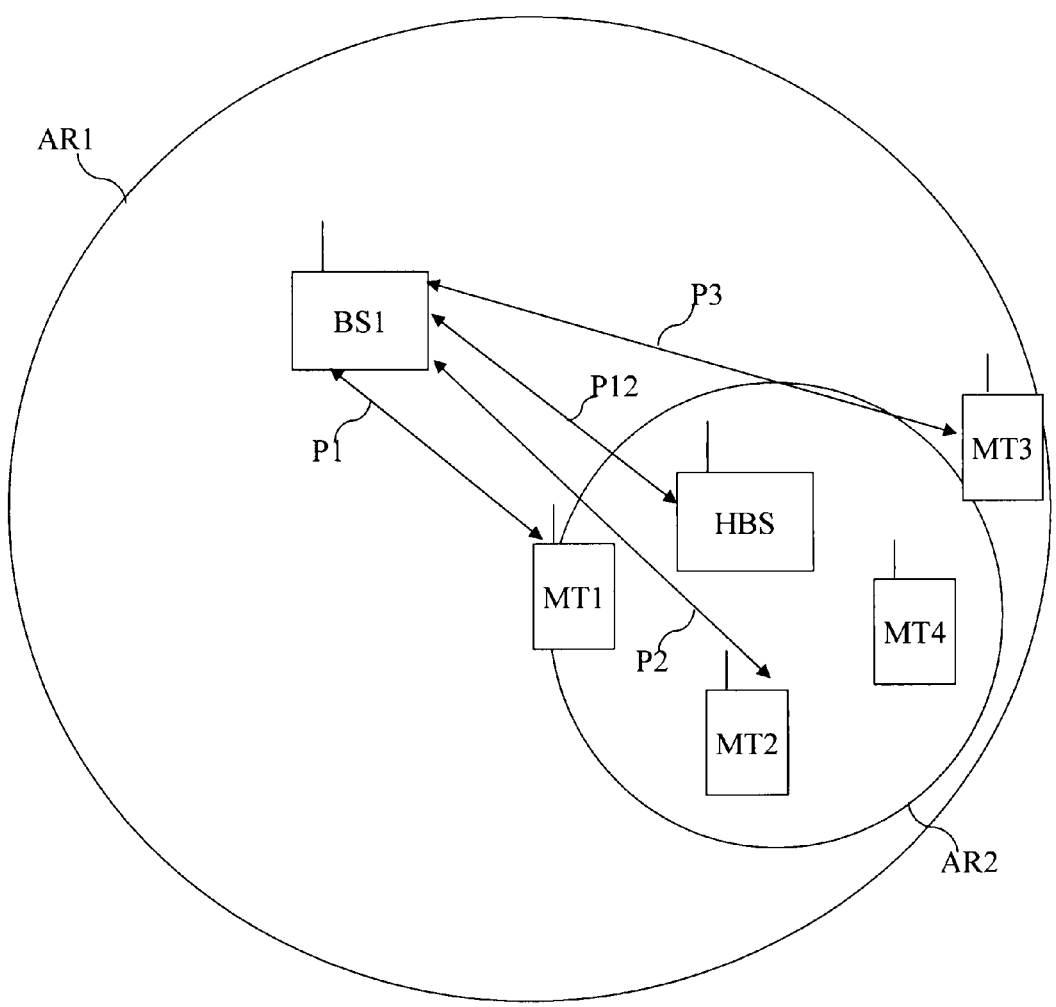
FIG. 1 represents a wireless cellular telecommunication network in which the present invention is implemented.

FIG. 1 represents a wireless cellular telecommunication network in which the present invention is implemented.

In FIG. 1, two base stations BS1 and HBS of a wireless cellular telecommunication network and four mobile terminals MT1, MT2, MT3 and MT4 are shown.

Only two base stations BS1 and HBS and four mobile terminals MT1, MT2, MT3 and MT4 are shown but we can understand that the present invention works when a more important number of base stations BS1 and/or HBS, and/or a more important number of mobile terminals MT exist.

More particularly, the present invention is also adapted in case the base station HBS is located into cells of plural base stations BS1.

The base station BS1 is for example a macro base station of a wireless cellular telecommunication network and the base station HBS is for example a home base station named also femto base station or pico base station.

The home base station HBS is for example located into home and may enable mobile terminals MT associated to the home base station HBS to access the wireless cellular telecommunication network.

For example, the mobile terminals MT1 to MT3 are served by the base station BS1 and the mobile terminal MT4 is served by the home base station HBS. The mobile terminal MT4 is associated to the home base station HBS.

For example, a home base station HBS and the mobile terminal MT4 are associated when the home base station HBS belongs to the owner of the mobile terminal MT4 or when the home base station HBS belongs to the family or friends of the owner of the mobile terminal MT4.

When a mobile terminal MT1 to MT4 is served by a base station BS or a home base station HBS, it can receive or establish or continue a communication with a remote telecommunication device.

The base station BS1 is able to receive signals transferred by mobile terminals MT which are located in the area AR1. The base station BS1 transfers signals which can be received and processed by mobile terminals MT located in the area AR1. The area AR1 is the cell of the base station BS1.

The home base station HBS transfers signals which can be received and processed by mobile terminals MT located in the area AR2.

The area AR2 is the cell of the home base station HBS and is at least partly comprised in the area AR1.

The mobile terminals MT1, MT2 and MT4 are located in the areas AR1 and AR2.

The mobile terminal MT3 is located in the area AR1.

The arrow noted P1 represents the wireless path between the base station BS1 and the mobile terminal MT1. The arrow noted P2 represents the wireless path between the base station BS1 and the mobile terminal MT2. The arrow noted P3 represents the wireless path between the base station BS1 and the mobile terminal MT3. The arrow noted P12 represents the wireless path between the base station BS1 and the home base station HBS.

According to the invention, the home base station HBS performs inter cell interference coordination procedure by:
transferring through the wireless interface 205 of the home base station HBS a first message to the base station BS1,
receiving through the wireless interface 205 of the home base station HBS, a message comprising information representative of the path between the home base station HBS and the base station BS1,
detecting through the wireless interface 205 the reception of messages transferred by the base station BS1 to mobile terminals MT, information comprised in at least one message enabling the determination of the coverage of the second base station BS1,
computing a metric from both information,
adjusting, according to the computed metric, the transmission power of the signals transferred by the first base station to at least a mobile terminal served by the first base station through the wireless interface and/or the transmission power of the signals transferred to the first base station by at least one mobile terminal served by the first base station.

Figure 2:
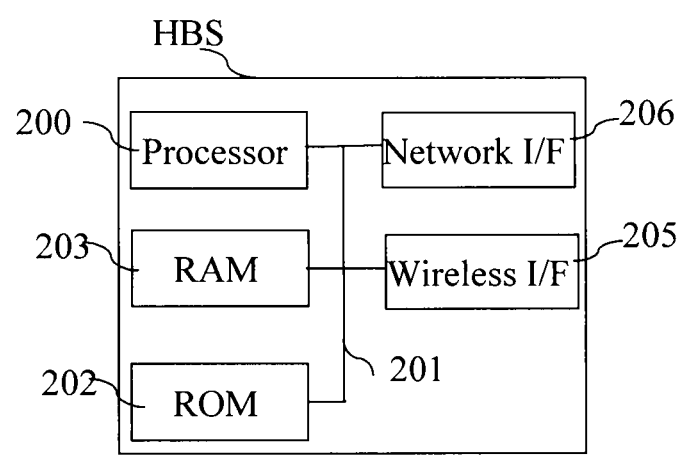
FIG. 2 is a diagram representing the architecture of a home base station in which the present invention is implemented.

FIG. 2 is a diagram representing the architecture of a home base station in which the present invention is implemented.

The home base station HBS has, for example, an architecture based on components connected together by a bus 201 and a processor 200 controlled by the program as disclosed in FIG. 3 or 4.

The bus 201 links the processor 200 to a read only memory ROM 202, a random access memory RAM 203, a wireless interface 205 and a network interface 206.

The memory 203 contains registers intended to receive variables and the instructions of the program related to the algorithm as disclosed in FIG. 3 or 4.

The processor 200 controls the operation of the network interface 206 and of the wireless interface 205.

The read only memory 202 contains instructions of the program related to the algorithm as disclosed in FIG. 3 or 4, which are transferred, when the home base station HBS is powered on, to the random access memory 203.

The home base station HBS may be connected to a telecommunication network through the network interface 206. For example, the network interface 206 is a DSL (Digital Subscriber Line) modem, or an ISDN (Integrated Services Digital Network) interface, etc. Through the network interface 206, the home base station HBS may transfer messages to the core network of the wireless cellular telecommunication network.

The wireless interface 205 and the network interface 206 are the resources of the home base station HBS used by a mobile terminal MT in order to access to the wireless cellular telecommunication network when the mobile terminal MT establishes or receives a communication with a remote telecommunication device.

The wireless interface 205 comprises means for adjusting the transmission power of signals transferred by the home base station HBS or the transmission power of signals transferred to the home base station HBS by the mobile terminals served by the home base station HBS according to an inter cell interference coordination (ICIC) procedure.

FIG. 3 discloses a first example of an algorithm executed by a home base station according to the present invention.

More precisely, the present algorithm is executed by the processor 200 of the home base station HBS.

The present algorithm may be executed when the home base station HBS is powered on or when the core network requests the execution of the present algorithm or is executed periodically.

The home base station HBS has limited mobile terminal transmission and reception functionalities which allow it to perform random access procedure at least until the home base station HBS gets a response from the base station BS1.

Usually, the random access procedure is based on a temporary identifier TUEID, which is picked up randomly by a mobile terminal MT in order to perform the random access procedure. This temporary identifier may also be called random access identifier or random access radio network temporary identifier (RA-RNTI). The home base station HBS, as a mobile terminal MT, picks up a TUEID in order to perform the random access procedure.

A UEID, User Equipment Identifier, is determined by a base station BS1 or home base station HBS for each mobile terminal MT located in the cell AR1 of the base station BS1 or the cell AR2 of the home base station HBS. The UEID identifies uniquely a mobile terminal MT located in the cell AR1 of the base station BS1 or the cell AR2 of the home base station HBS.

A TUEID is selected randomly, among a limited number of known identifiers, by a mobile terminal MT when it intends to be served by a base station BS or a home base station HBS. The TUEID is used until potential random access contention is resolved and the effective UEID is determined by the base station BS1.

At step S300, the processor 200 commands the transfer to the base station BS1 and through the wireless interface 205 of a random access message on the physical random access channel (PRACH) including the TUEID information. The TUEID information is identified by the frequency/time/code resource used to transfer the random access message or is contained in the message or is identified by the frequency/time/code resource used to transfer the random access message and the message. The purpose of the transfer of such message by a mobile terminal MT is to get some information from the base station BS in response to its initial random access attempt. This information is for instance classically used in order to properly schedule and transfer further uplink messages needed to complete the random access procedure.

According to the invention, the home base station HBS transfers like a mobile terminal MT, a random access message to the base station BS1 in order to receive in response, information that may enable the determination of the path between the home base station HBS and the base station BS1. The path may be the path distance between the home base station HBS and the base station BS1 or may be the path gain between the home base station HBS and the base station BS1.

At next step S301, the processor 200 detects the reception by the wireless interface 205 of the information that may enable the determination of the path between the home base station HBS and the base station BS1.

Information that may enable the determination of the path between the home base station HBS and the base station BS1 may be a timing advance information, which is representative of the home base station HBS and base station BS1 round-trip delay and that must be applied on signals the home base station HBS should transfer to base station BS1 in order to complete the random access procedure. The path gain from the home base station HBS to the base station BS1 could be deduced from timing advance information if no fading or shadowing exists or if their effects are neglected. The timing advance information is representative of the path distance separating the home base station HBS and base station BS1.

Information that may enable the determination of the path between the home base station HBS and the base station BS1 may be a power control information, which indicates with which power the home base station HBS should transfer signals to base station BS1 in order to complete the random access procedure. The power control information can also indicate with which power the base station BS1 has transferred signals to home base station HBS. The path gain from the home base station HBS to the base station BS1 could be deduced from that indication.

Information that may enable the determination of the path between the home base station HBS and the base station BS1 may be a Modulation and Coding Scheme (MCS), indicating the MCS to be used in next uplink message by the home base station HBS for transferring data to the base station BS1. The MCS can also indicate with which MCS the base station BS1 has transferred signals to home base station HBS. The MCS may or may not be indicated into the response message. The path gain from the home base station HBS to the base station BS1 could be deduced from MCS.

Information that may enable the determination of the path between the home base station HBS and the base station BS1 may be the number of resources of the downlink channel intended for the home base station HBS by the base station BS1.

Information that may enable the determination of the path between the home base station HBS and the base station BS1 may be comprised in at least one resource of the downlink channel intended for the home base station HBS and is the reception power of signals transferred in the at least one resource with respect to average power of signals transferred in other resources.

Information that may enable the determination of the path between the home base station HBS and the base station BS1 may be a combination of above cited information.

A next step S302, the processor 20 memorizes in the RAM memory 203 the information that may enable the determination of the path between the home base station HBS and the base station BS1 or memorizes the path gain between the home base station HBS and base station BS1 which could be deduced from that information.

At next step S303, the processor 200 sets a variable i to null value.

At next step S304, the processor 200 commands the wireless interface 205 in order to search a RACH response transferred by the base station BS1 to a mobile terminal MT in response to a RACH message transferred by the mobile terminal MT.

The wireless interface 205 scans the downlink signals transferred by the base station BS1 in order to detect random access responses intended for mobile terminals MT. For example, if the random access procedure relies on TUEID, such scan is relatively simple because the number of TUEIDs is limited.

At next step S305, the processor 200 checks if a RACH response transferred by the base station BS1 to a mobile terminal MT served by the base station BS1 is detected.

If a RACH response transferred by the base station BS1 to a mobile terminal MT is detected, the processor 200 moves to step S306. Otherwise, the processor 200 returns to step S304.

At step S306, the processor 200 memorizes in the RAM memory 203 information comprised in the RACH response. Information comprised in the RACH response may enable the determination of the coverage of the base station BS1. Information comprised in the RACH response may enable the determination of the radius of the cell AR1 of the base station BS1 or may be representative of the maximum distance between the base station BS1 and the mobile terminal MT located at the frontier of the cell AR1 and/or may also be representative of the minimum path gain including fading and shadowing in the cell AR1 of the base station BS1.

In a variant the processor memorizes in the RAM memory 203 the path gain between mobile terminal MT and base station BS1 that can be deduced from this information.

The information comprised in the RACH response that may enable the determination of the coverage of the base station BS1 may be a timing advance information, which is representative of the round-trip delay between the mobile terminal MT to which the message is intended and base station BS1 and that must be applied on signals the mobile terminal MT to which the message is intended should transfer to base station BS1 in order to complete the random access procedure. The path gain from the home base station HBS to the base station BS1 could be deduced from timing advance information if no fading or shadowing exists. The timing advance information is representative of the distance separating the mobile terminal MT to which the message is intended and base station BS1.

The information comprised in the RACH response that may enable the determination of the coverage of the base station BS1 may be a power control information, which indicates with which power the mobile terminal MT to which the message is intended should transfer signals to base station BS1 in order to complete the random access procedure. The power control information can also indicate with which power the base station BS1 has transferred signals to the mobile terminal MT. The path gain between the mobile terminal MT to which the message is intended and base station BS1 could be deduced from that indication and power control information, especially if initial random access uplink transmission power is predetermined.

The information comprised in the RACH response that may enable the determination of the coverage of the base station BS1 may be a Modulation and Coding Scheme (MCS) indication, indicating the MCS to be used in next uplink message to be transferred by the mobile terminal MT to which the message is intended. The path gain from the mobile terminal MT to the base station BS1 could be deduced from MCS, especially if initial random access uplink transmission power is predetermined.

The information comprised in the RACH response that may enable the determination of the coverage of the base station BS1 may be a combination of above cited information.

At next step S307, the processor 200 increments the variable i by one.

At next step S308, the processor 200 checks if enough RACH responses have been detected. For example, the processor 200 checks if the variable i is upper than a predetermined value.

If the variable i is upper than a predetermined value, the processor 200 moves to step S309. Otherwise, the processor 200 returns to step S304.

At step S309, the processor 200 computes a metric according to the present invention.

When the number of detected random access responses is high enough, i.e., when the statistics on the path gains or path distances between base station BS1 and mobile terminals MT is sufficient, the home base station HBS can deduce the coverage of base station BS1 from the probability density function of path gains or path distances between base station BS1 and mobile terminals MT the home base station HBS has built. For instance, the minimum value of path gain or the maximum value of distance can be taken. This value is representative of the maximum coverage of the base station BS1.

The home base station HBS computes a metric from the path gain from base station BS1 to home base station HBS and from the coverage of the base station BS1.

For example, the metric is determined using timing advance values. The timing advance value is transferred in one random access response. The base station BS1 to home base station HBS distance is computed by dividing the timing advance value memorized at step S302 by two and multiplying it by the light celerity.

For the mobile terminal MT of which a random access response is detected at step S305 and which has the largest timing advance value, the home base station HBS can compute the base station BS1 to mobile terminal MT distance by dividing the timing advance value memorized at step S306 by two and multiplying it by the light celerity.

The coverage and the base station BS1 to home base station HBS distance are linked to path gain values. For instance, the path gain may be inversely proportional to the distance to the power alpha. Alpha is representative of the propagation model. For example, alpha equals two or more.

In another example, the metric is determined using power control information.

The power control value is transferred in one random access response. The base station BS1 to home base station HBS path gain is evaluated using the power control value memorized at step S302. For instance, the path gain may be evaluated by taking the inverse of the power control value.

For the mobile terminal MT of which a random access response is detected at step S305 and which has the largest power control value, the home base station HBS can evaluate the minimum path gain for a mobile terminal MT communicating with base station BS1 which is representative of the coverage of base station BS1 using the power control value memorized at step S306. Here, coverage is meant as minimum path gain, not maximum distance, since in case of shadowing, there is no direct relationship between path gain and distance. For instance, the path gain may be evaluated by taking the inverse of the power control value.

In both examples, the metric is then computed based on the base station BS1 to home base station HBS path gain and the path gain related to base station BS1 coverage. For instance, the metric is proportional to the base station BS1 to home base station HBS path gain divided by the path gain related to base station BS1 coverage.

At next step S310, the processor 200 applies a limitation to the home base station HBS transmit power and/or to the transmit powers of all the mobile terminals MT the home base station HBS serves. The limitation can be applied on the total transmit power but can also be per Hz, in order to avoid concentrating the total transmit power on a limited frequency resource too much. The mobile terminals MT the home base station HBS serves are informed that their maximum transmit power is limited to a given value.

FIG. 4 discloses a second example of an algorithm executed by a home base station according to the present invention.

More precisely, the present algorithm is executed by the processor 200 of the home base station HBS.

The present algorithm may be executed when the home base station HBS is powered on or when the core network requests the execution of the present algorithm or is executed periodically.

The home base station HBS has limited mobile terminal MT transmission and reception functionalities which allow it to perform random access procedure, get connected with the base station BS1 and have scheduled data in the downlink channel.

At step S400, the processor 200 commands the wireless interface to transfer messages to the base station BS1 in order to perform a random access procedure and get an allocated UEID.

The home base station HBS receives a UEID determined by the base station BS1 once the random access procedure has been completed.

At next step S401, the processor 200 gets information transferred by the base station BS1 to the home base station HBS. That information may enable the determination of the path between the base station BS1 and the home base station HBS.

Information that may enable the determination of the path between the base station BS1 and the home base station HBS are for example resources of the downlink channel intended for the home base station.

For example, the wireless interface detects the number of resources named sometimes control channel elements intended to the home base station HBS. When the home base station HBS is far from the base station BS1 or when the channel conditions are low, the base station BS1 transfers information to the home base station through plural control channel elements. When the home base station HBS is close to the base station BS1 or when the channel conditions are high, the base station BS1 transfers information to the home base station through a single control channel element. Since the same information is transmitted whatever the number of control channel elements, the spectral efficiency varies with the number of control channel elements. The higher the number of control channel elements is, the lower the spectral efficiency is.

Information that may enable the determination of the path between the base station BS1 and the home base station HBS may be obtained by a blind detection among control resources. For instance, the control information is masked with the UEID of the home base station HBS.

Information that may enable the determination of the path between the base station BS1 and the home base station HBS may be for example the received power of the signals on resources intended to the home base station HBS compared with the average of the received power of signals on resources not intended to the home base station HBS.

Information that may enable the determination of the path between the base station BS1 and the home base station HBS may be comprised in the resources intended to the home base station HBS and may be a power control information, which indicates with which power the home base station HBS to which the message is intended should transfer signals to base station BS1 in the uplink channel or may indicate with which power the base station BS1 has transferred signals to the home base station HBS. The path gain between the home base station HBS and base station BS1 could be deduced from that indication and power control information.

Information that may enable the determination of the path between the base station BS1 and the home base station HBS may be the number of control channel elements intended to the home base station HBS. Since the number of control channel elements corresponds to a spectral efficiency, the path gain from the home base station HBS to the base station BS1 could be deduced from the number of control channel elements.

Information that may enable the determination of the path between the base station BS1 and the home base station HBS may be the modulation and coding scheme used to transfer signals on resources intended to the home base station. This modulation and coding scheme may be found by blind detection among different pre-determined modulation and coding schemes.

Information that may enable the determination of the path between the base station BS1 and the home base station HBS may be comprised in the resources intended to the home base station HBS and may be a Modulation and Coding Scheme (MCS) indication, indicating the MCS to be used in next uplink message to be transferred by the home base station HBS or indicating the MCS which was used in a downlink message transferred by the base station BS1 to the home base station HBS. The path gain from the home base station HBS to the base station BS1 could be deduced from MCS.

Information that may enable the determination of the path between the base station BS1 and the home base station HBS may be a combination of above cited information.

The base station BS1 transfers the data through the wireless link.

Then, the home base station HBS can read the control information (grants) corresponding to data transmission intended to the home base station HBS which acts as a UE. Control information corresponding to uplink grants can be easily obtained by transferring a scheduling request to the base station BS1. However, downlink grants might be preferable since the coverage could be obtained for grants for system information, which are downlink grants. For example, the home base station HBS may simulate some traffic by transferring to the base station BS1 through its network interface 206, data intended for itself.

At next step S402, the processor 200 memorizes information obtained at step S401.

Based on at least one of these information, the processor 200 determines at step S402, the path gain between the base station BS1 and the home base station HBS.

The determined path gain is then memorized.

At next step S403, the processor 200 commands the wireless interface 205 to scan the channel resources on which control information corresponding to system information are broadcasted to all the mobile terminals MT or multicasted to mobile terminals MT.

At next step S404, the processor 200 checks if control information corresponding to system information has been found by the wireless interface 205. Control information corresponding to system information are representative of the coverage of the base station BS1.

The processor 200 gets information from the control information corresponding to system information.

Information are for example resources of the control information intended for the home base station.

For example, the wireless interface detects the number of resources named sometime control channel elements containing the control information corresponding to system information. When the coverage of the base station BS1 corresponds to a large distance or a low path-gain, the base station BS1 transfers the control information corresponding to system information through plural control channel elements. When the coverage of the base station BS1 corresponds to a small distance or a large path gain, the base station BS1 transfers the control information corresponding to system information through a single control channel elements. Since the same information is transmitted whatever the number of control channel elements, the spectral efficiency varies with the number of control channel elements. The higher the number of control channel elements is, the lower the spectral efficiency is.

The control information corresponding to system information may be obtained by a blind detection among control resources. For instance, the control information is masked with a special identifier, which may be called system radio network temporary identifier (S-RNTI). Information may be for example the received power of the signals on resources used to broadcast the control information corresponding to system information compared with the average of the received power of signals on resources not used to broadcast the control information corresponding to system information.

Information may be comprised in the resources containing the control information corresponding to system information and may be a power control information, which indicates with which power the base station BS1 has broadcasted system information. The minimum path gain or the maximum distance, corresponding to the coverage of base station BS1, could be deduced from that indication.

Information may be the number of control channel elements containing the control information corresponding to system information. Since the number of control channel elements corresponds to a spectral efficiency, the minimum path gain or the maximum distance, corresponding to the coverage of base station BS1, could be deduced from that indication.

Information may be the modulation and coding scheme used to transfer the control information corresponding to system information. This modulation and coding scheme may be found by blind detection among different pre-determined modulation and coding schemes.

Information may be comprised in the resources containing the control information corresponding to system information and may be a Modulation and Coding Scheme (MCS) indication, indicating the MCS which was used to broadcast the system information. The minimum path gain or the maximum distance, corresponding to the coverage of base station BS1, could be deduced from that indication.

The information may be a combination of above cited information.

If control information corresponding to system information has been found by the wireless interface 205, the processor 200 moves to step S405. Otherwise, the processor 200 returns to step S403.

At step S405, the processor 200 memorizes the control information detected at step S403.

Since these information are intended for all the mobile terminals MT, including the mobile terminals which are close to the cell AR1 boundary or even further, or mobile terminals with very low path gain due to strong shadowing, the modulation and coding scheme and the power control of control and/or data are set according to the coverage of the base station BS1. From the control information detected at step S403, the home base station HBS can determine the coverage of the base station BS1, i.e. the highest distance or minimum path gain between the base station BS1 and a mobile terminal MT served by the base station BS1.

At next step S406, the processor 200 computes a metric from information memorized at steps S402 and S405.

For example, a coding rate and the modulation scheme, and thus a spectral efficiency, can be deduced from the modulation and coding scheme for data or control transmission or the number of resources for control information. The spectral efficiency obtained at step S403 or at step S402 is related to the path gain: the higher the spectral efficiency is, the higher the path gain is. Thus, the MCS or the number of resources obtained at step S402 and the MCS obtained at step S403 can be used in order to derive the metric.

The transmission power of the control information for each UE or for system information may be different. Thus, the power of the control information for the home base station HBS obtained at step S402 and the power of the control information obtained at step S403 can be used in order to derive the metric.

Furthermore, the relative received power of the control information at step S402 compared to the received power of the control information detected at step S403 can be used in order to derive the metric.

At next step S407, the processor 200 applies a limitation to the home base station HBS transmit power and/or to the transmit powers of all the mobile terminals MT the home base station HBS serves. The limitation can be applied on the total transmit power but can also be per Hz, in order to avoid concentrating the total transmit power on a limited frequency resource too much. The mobile terminals MT that the home base station HBS serves are informed that their maximum transmit power is limited to a given value.

It has to be noted here that in a variant, the steps S303 to S309 of FIG. 3 may be replaced by the steps S403 to S406 of FIG. 4.

In another variant, the steps S403 to S406 of FIG. 4 may be replaced by the steps S303 to S309 of FIG. 3.

Naturally, many modifications can be made to the embodiments of the invention described above without departing from the scope of the present invention.

The invention claimed is:

1. A method for adjusting transmission power of signals transferred by a first base station through a wireless interface and/or transferred to the first base station, the first base station being located in a cell of a second base station, wherein the method is executed by the first base station and comprises:
   transferring through the wireless interface of the first base station a first message to the second base station, the first message being a random access message;
   receiving in response to the first message through the wireless interface of the first base station, a message comprising information representative of a path between the first base station and the second base station;
   receiving through the wireless interface messages transferred by the second base station to mobile terminals, information comprised in at least one message enabling determination of coverage of the second base station;
   computing a metric from both information; and
   adjusting, according to the computed metric, the transmission power of the signals transferred by the first base station to at least a mobile terminal served by the first base station through the wireless interface and/or the transmission power of the signals transferred to the first base station by at least one mobile terminal served by the first base station.

2. The method according to claim 1, wherein information representative of the path between the first and the second base stations is a timing advance information which is representative of a distance separating the first and second base stations.

3. The method according to claim 1, wherein information representative of the path between the first and the second base stations is a power control information, which indicates with which power the first base station should transfer signals to the second base station and/or transmission power of signals transferred by the second base station to the first base station.

4. The method according to claim 1, wherein information representative of the path between the first and the second base stations is a modulation and coding scheme which should be used by the first base station to transfer signals to the second base station and/or which has been used by the second base station for transferring signals to the first base station.

5. The method according to claim 1, wherein information representative of the path between the first and the second base stations is a number of resources of a downlink channel, the resources being intended for the first base station by the second base station, the downlink channel being a channel used by the second base station for transferring data to the first base station and/or to at least one mobile terminal.

6. The method according to claim 1, wherein information representative of the path between the first and the second base stations is comprised in at least one resource of a downlink channel, the at least one resource being intended for the first base station by the second base station, the downlink channel being a channel used by the second base station for transferring data to the first base station and/or to at least one mobile terminal and information representative of the path between the first and the second base stations is a reception power of signals transferred in the at least one resource with respect to average power of signals transferred in other resources of the downlink channel.

7. The method according to claim 1, wherein the at least one message comprising information enabling the determination of the coverage of the second base station is at least one message transferred by the second base station to one mobile terminal served by the second base station.

8. The method according to the claim 7, wherein information comprised in at least one message enabling the determination of the coverage of the second base station is a timing advance information which is representative of a distance separating the second base station and one mobile terminal served by the second base station.

9. The method according to claim 7, wherein information comprised in at least one message enabling the determination of the coverage of the second base station is a power control information, which indicates with which power a mobile terminal served by the second base station should transfer signals to the second base station and/or with which power the second base station has transferred signals to a mobile terminal served by the second base station.

10. The method according to the claim 8, wherein information comprised in at least one message enabling the determination of the coverage of the second base station is a modulation and coding scheme which should be used by a mobile terminal served by the second base station to transfer signals to the second base station and/or which has been used by the second base station to transfer signals to a mobile terminal served by the second base station.

11. The method according to claim 1, wherein information comprised in at least one message enabling the determination of the coverage of the second base station is a control information corresponding to system information broadcasted by the second base station to mobile terminals served by the second base station.

12. The method according to claim 11, wherein information comprised in at least one message enabling the determination of the coverage of the second base station is a modulation and coding scheme which has been used by the second base station to broadcast system information to mobile terminals, the modulation and coding scheme being indicated in the control information.

13. The method according to claim 11, wherein information comprised in at least one message enabling the determination of the coverage of the second base station is a number of resources of a downlink channel on which the control information is broadcasted, the downlink channel being a channel used by the second base station for transferring data to the first base station and/or to at least one mobile terminal.

14. A device for adjusting transmission power of signals transferred by a first base station through a wireless interface and/or transferred to the first base station, the first base station being located in a cell of a second base station, wherein the device for adjusting the transmission power is included in the first base station and comprises:
    means for transferring through the wireless interface of the first base station a first message to the second base station, the first message being a random access message;
    means for receiving through the wireless interface of the first base station, in response to the first message, a message comprising information representative of a path between the first base station and the second base station;
    means for receiving through the wireless interface messages transferred by the second base station to mobile terminals, information comprised in at least one message enabling determination of coverage of the second base station;
    means for computing a metric from both information;
    means for adjusting, according to the computed metric, the transmission power of the signals transferred by the first base station to at least a mobile terminal served by the first base station through the wireless interface and/or the transmission power of the signals transferred to the first base station by at least one mobile terminal served by the first base station.

15. A non-transitory computer-readable storage medium storing computer-readable instructions thereon, which, when executed by a computer, cause the computer to perform the method according to any one of claims 1 to 13.

16. A device for adjusting transmission power of signals transferred by a first base station through a wireless interface and/or transferred to the first base station, the first base station being located in a cell of a second base station, wherein the device for adjusting the transmission power is included in the first base station and comprises:
    a transferring unit configured to transfer through the wireless interface of the first base station a first message to the second base station, the first message being a random access message;
    a first receiver configured to receive through the wireless interface of the first base station, in response to the first message, a message comprising information representative of a path between the first base station and the second base station;
    a second receiver configured to receive through the wireless interface messages transferred by the second base station to mobile terminals, information comprised in at least one message enabling determination of coverage of the second base station;
    a processor configured to compute a metric from both information;
    an adjuster configured to adjust, according to the computed metric, the transmission power of the signals transferred by the first base station to at least a mobile terminal served by the first base station through the wireless interface and/or the transmission power of the signals transferred to the first base station by at least one mobile terminal served by the first base station.

* * * * *